Jan. 30, 1962    M. A. CHAVANNES    3,018,540
METHODS FOR MAKING EMBOSSING ROLLERS
Filed Nov. 18, 1957    3 Sheets-Sheet 1
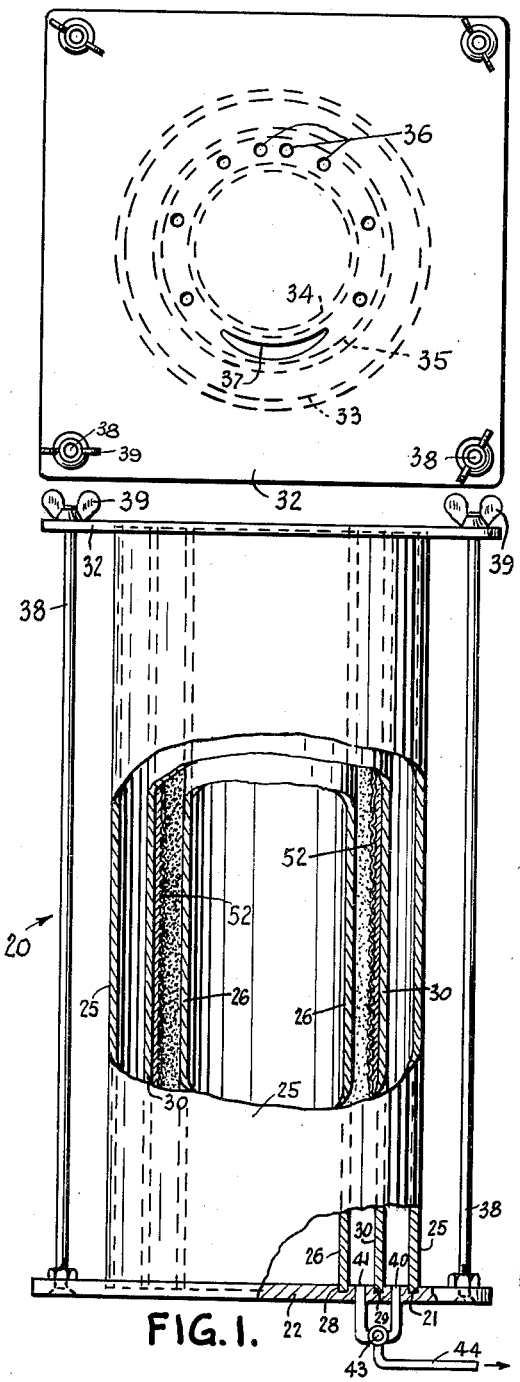
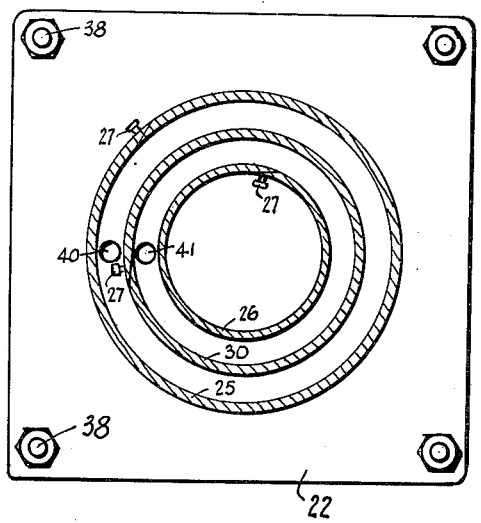
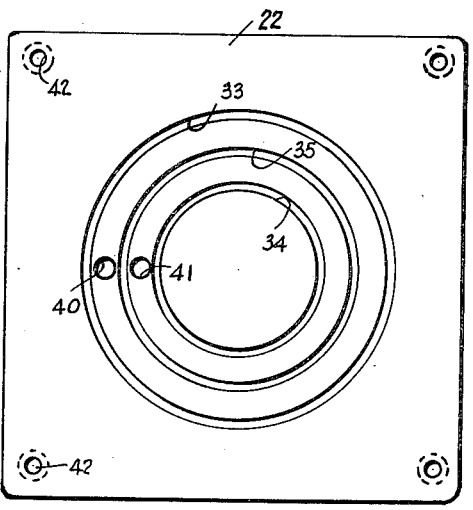
INVENTOR.
MARC A. CHAVANNES
BY
*Percy Freeman*
ATTORNEY.

Jan. 30, 1962 M. A. CHAVANNES 3,018,540
METHODS FOR MAKING EMBOSSING ROLLERS
Filed Nov. 18, 1957
3 Sheets-Sheet 2

INVENTOR.
MARC A. CHAVANNES.
BY
*Percy Freeman*
ATTORNEY.

Jan. 30, 1962     M. A. CHAVANNES     3,018,540
METHODS FOR MAKING EMBOSSING ROLLERS
Filed Nov. 18, 1957     3 Sheets-Sheet 3

INVENTOR.
MARC A. CHAVANNES.
BY Percy Freeman
ATTORNEY.

United States Patent Office 3,018,540
Patented Jan. 30, 1962

3,018,540
METHODS FOR MAKING EMBOSSING ROLLERS
Marc A. Chavannes, Brooklyn, N.Y., assignor to Sealed Air Corporation, Hawthorne, N.J.
Filed Nov. 18, 1957, Ser. No. 697,157
12 Claims. (Cl. 29—148.4)

This invention relates to methods for constructing embossing rollers for use in the embossing and forming of various types of thermoplastic sheet and film material.

Ordinarily, it is first necessary to form an embossing roller or cylinder by conventional etching, rolling, or engraving methods in order to emboss thermoplastic sheet material. These methods are not only laborious and time-consuming, but are also quite expensive so that the cost of the finished product is substantially increased. Furthermore, embossing cylinders produced by these methods usually lack accuracy and detail when it is desired to simulate various types of complex surface contours and textures such as those found in drapery, upholstery, and table cloth fabrics.

Accordingly, it is an object of the present invention to provide simple and efficient methods for constructing embossing rollers of the above type that will overcome the aforementioned difficulties.

Another object of the present invention is to provide an economical method of casting a highly improved embossing cylinder which minutely reproduces every detail of the selected pattern material.

Still another object of the present invention is to provide novel methods for making metal embossing cylinders which may be used for either pressure or suction embossing of various types of thermoplastic sheets and film.

A more general object of the present invention is to provide a novel method of constructing an embossing roller for embossing thermoplastic sheet material, which roller has an embossing surface that is an accurate high fidelity reproduction of the surface appearance and texture of various types of fibrous and porous materials.

Another object of the present invention is to provide a method of constructing embossing rollers for embossing thermoplastic material which utilizes the material to be reproduced as a pattern in the construction of the mold which, in turn, is used to form the embossing roller so that the natural and minute interstices and surface configurations are directly reproduced from the textured surface of the original material.

All of the foregoing and still further objects and advantages of this invention will become apparent from a study of the following specification, taken in connection with the accompanying drawing, wherein:

FIG. 1 is a front elevational view, with parts broken away, of apparatus forming a part of the present invention.

FIG. 2 is a top plan view of the device shown in FIG. 1.

FIG. 3 is a transverse cross-sectional view taken along line 3—3 of FIG. 1.

FIG. 4 is a top plan view of the base of the apparatus shown in FIG. 1.

Figure 5:
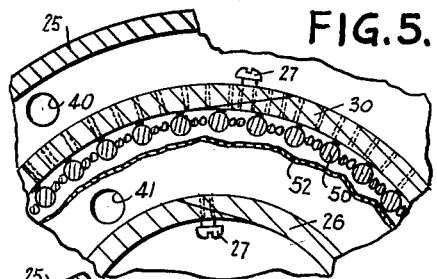
FIGS. 5 to 7 are fragmentary cross-sectional views of certain parts of the apparatus shown in FIGS. 1 to 4 in operative use for forming an embossing roller in accordance with one method of the present invention.

Referring now more in detail to the drawing, and more particularly to FIGS. 1 to 4 and 11 thereof, molding apparatus for producing embossing rollers in accordance with the present invention is shown to include a molding assembly 20. This assembly has a base plate 22 that is provided with a plurality of concentric circular grooves 21, 28, 29 for receiving the adjacent end of a circular cylindrical outer jacket 25, an inner jacket 26, and an intermediate shell 30, respectively, which are concentrically arranged. The outer and inner jacket walls are imperforate, while the shell wall 30 is perforated with very small holes throughout its entire surface area to permit the passage of air therethrough, as will be hereinafter described. A top plate 32 is provided with similar concentric grooves 33, 34, 35, for receiving the opposite ends of the respective outer, inner, and intermediate cylindrical members whereby the relationship therebetween is maintained. The base and top plates 22, 32 cooperate with the respective jackets and shell to define substantially sealed compartments therebetween which are in communication with each other through the perforations in the shell wall 30. The top plate 32 is provided with vent holes 36 which communicate with the space between the inner jacket 26 and shell 30, as does a pouring spout 37 through which molding material may be fed into the compartment.

Figure 2A:
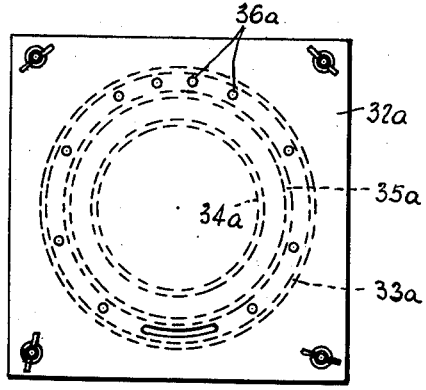
FIG. 2A is a view similar to FIG. 2, showing a modified form of structure.

With reference to FIG. 2A of the drawing, a similar top plate 32a is provided with circular grooves 33a, 34a, 35a which correspond to the grooves provided in the aforementioned top plate 32. However, in this top plate, the vent holes 36a and a pouring spout communicate with the space between the outer jacket 25 and the perforated shell 30, for use in accordance with a modified method of the present invention.

Referring again to FIG. 1 of the drawing, the base plate 22 is shown to be provided with a port 40 in communication with the space between the outer jacket 25 and the perforated shell 30, and another port 41 in communication with the space between the inner jacket 26 and perforated shell 30. These ports 40, 41 may be selectively opened and closed by any suitable means, such as a manually operated valve 43 which is in communication with a vacuum pump 45 through a conduit 44. Thus, when using the top plate 32, a partial vacuum can be provided within the space defined by the outer jacket and perforated shell by opening the one port 40 and closing the other port 41. When the alternate plate 32a is used, the vacuum can be provided between the inner jacket 26 and the perforated shell 30. Threaded tie rods 38 and wing nuts 39 facilitate the assembly and disassembly of the apparatus, including the exchange of the respective top plates 32, 32a. If desired, each of the concentric grooves may be provided with suitable gaskets to obtain the desired seal between the jackets and the plates. As is shown in FIG. 3, each of the jackets and shell is provided with a longitudinal seam that is releasably held together by thumb screws 27 so that these members may be opened to facilitate the removal of certain of the mold elements later described.

EXAMPLE I

Figure 6:
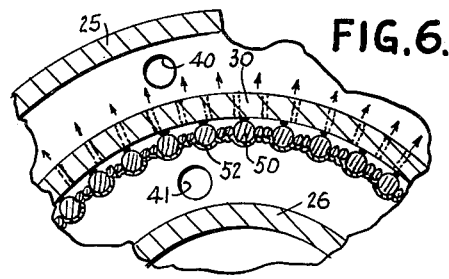
Figure 7:
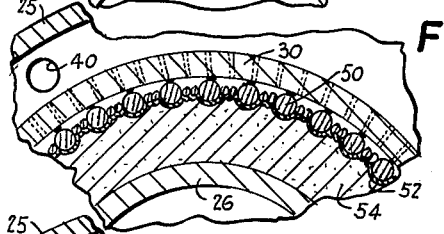
Figure 8:
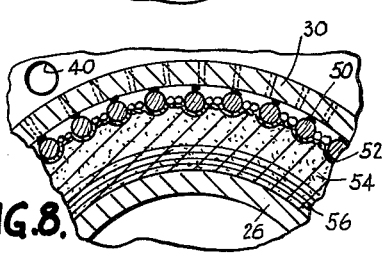
FIG. 8 is a view similar to FIG. 7 showing a slightly modified arrangement.

Referring now to FIGS. 5 to 7 of the drawing, one method of molding embossing cylinders in accordance with the present invention is illustrated. A fabric sized with a melamine base resin and cured is adhered with a thermosetting adhesive upon the inner surface of the perforated shell 30. This fabric 50 which forms the pattern for the mold, may be of substantially any type of drapery, upholstery, or garment fabric. The longitudinal edges of the fabric used are butted together to form a cylinder in any desired way which will avoid the reproduction of a seam that will be visible to the eye. Thus, the butting of the material used must be made in such a way that the warp and the chains of the two ends face each other as they do in the rest of the weave. If the weave itself has designs or pattern as is the case with fabric woven on Jacquard looms, the diameter of the tube must be determined by the necessity of the repeats of the design or the pattern so that where the two ends meet this design or pattern is similar to the rest of the weave. It has been found useful to cut the ends in some cases by following the design to avoid cutting through it which would otherwise leave a small seam line in the matrix.

After the tubular fabric pattern has been secured to the inside surface of the perforated shell, a tube 52 of polyethylene resin of a thickness of 1.5 mill, the outside diameter of which corresponds to the inside diameter of the shell upon which, the fabric pattern is supported, is placed over the fabric cylinder. This cylinder assembly is then placed within the outside jacket 55 which has an inside diameter larger than the outside diameter of the perforated shell. By then securing the base plate 22 and the top plate 32 together by means of the tie rods, and opening the port 40, the vacuum pump 45 can be used to create a partial vacuum of approximately fifteen inches of mercury within the space between the outer jacket and perforated wall so as to draw the polyethylene tube against the surface of the fabric. While still maintaining the negative pressure, the entire assembly is then placed within an oven and heated at a temperature that will soften the polyethylene and permit it to mold itself perfectly against the fabric. A temperature of approximately 230° F. was found to be most suitable for this purpose, though satisfactory results were obtained by temperatures of between about 180° F. and about 230° F.

The vacuum is maintained during the heating of the assembly, as well as during the cooling thereof at room temperature so as to maintain the exact surface configuration of the fabric. An epoxy resin 54 such as epichlorohydrin, mixed with its hardener (bisphenol A) and its filler (aluminum flakes), is then poured into the space between the polyethylene film and the inner jacket 26, as shown in FIG. 7. After the reaction has taken place between the resin and its hardener, the material will set and harden within approximately twenty-four hours. The mold is then cured at progressive temperatures: about one and one-half hours at about 150° F., about two hours at about 180° F., following which the outer jacket is removed and the fabric with its polyethylene film is separated from the resin. The last two steps of curing, about two hours at about 250° F. and about three hours at about 350° F. being made on the mold of the inner shell. Finally, the inner shell is removed and the resin roller perforated by drilling holes small enough so that their presence will not be noticeable upon the films embossed thereby. A drill hole as fine as .01 of an inch in diameter might be necessary for embossing film of 2 mill, while a hole as large as .028 of an inch in diameter can be made for embossing sheet of 10 mill. The finished roller is then ready to be placed upon the mandrel that may be used in the continuous vacuum embosser described in my Patents Nos. 2,776,451 and 2,776,452.

EXAMPLE II

If desired, polyvinyl chloride resin of approximately one and one-half mill may be used instead of polyethylene referred to in Example I, to reproduce the surface texture of the pattern material. The pattern material fabric is sized with epoxy base compound and is secured with a thermosetting adhesive to the inner surface of the shell 30 with its longitudinal edges butted together. A tube of polyvinyl chloride resin is then placed within the shell adjacent to the inner surface of the pattern fabric. In the manner hereinbefore described, a vacuum corresponding to 25 inches of mercury is then imposed upon the film, and the assembly placed within the oven 48 at a temperature of approximately 350° F., at which temperature the polyvinyl chloride perfectly molds itself against the surface of the fabric. The assembly is then removed from the oven and cooled as hereinbefore described.

If desired, the inner jacket 26 may be covered with fibre glass fabric 56 that is embedded in the same epoxy resin that is used to cast the roller before injecting the casting material into the cavity of the molding apparatus. The use of fibre glass in this way will rigidify the finished embossing roller which may be desired. The fibre glass fabric is coated by brushing an uncured coat of resin upon the inner jacket 26, as well as upon each layer of the fibre glass fabric that is used. For example, approximately ten layers may be wrapped upon the inner jacket in this way, so that the total thickness for this laminate is approximately three-eighths of an inch. After the mold components have been properly assembled, the epoxy resin is poured into the pouring spout 27 of the top plate 32 to produce the molded cylinder. To provide additional protection and to facilitate the release of the polyvinyl chloride film from the epoxy resin, low molecular weight polyethylene can be brushed or sprayed upon the polyvinyl chloride film so as to act as a release agent or separator for facilitating the removal of the pattern from the molded epoxy. To avoid bubbles of air upon the surface of the finished cylinders, a coat of the same epoxy resin can be brushed over the polyethylene release coat to facilitate the flow of material over the entire surface of the pattern. Then continue the same procedures as followed in Example I to complete the embossing roller.

EXAMPLE III

The same structure and method illustrated in FIGS. 5 to 7 may be used to provide a molded embossing cylinder of a metallic alloy composed of approximately eighty partys of bismuth and twenty parts of tin. After the mold has been placed in the oven, the temperature is lowered to 275° and while confined therein, the metallic alloy is poured into the pouring spout at an approximate temperature of 335° F. The assembly is then cooled and the inner and outer jackets removed, following which the metallic roller may be perforated by drilling. This mold is then ready to be supported by a mandrel for use in connection with a continuous vacuum embosser.

EXAMPLE IV

Figure 9:
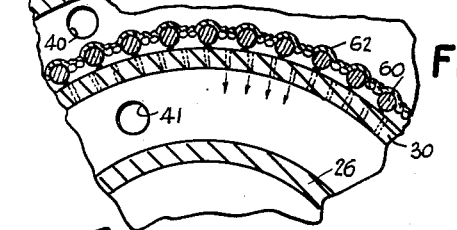
FIGS. 9 and 10 are views similar to FIGS. 5 to 7, showing the manner in which an embossing roller is fabricated in accordance with a modified method of the present invention.
Figure 10:
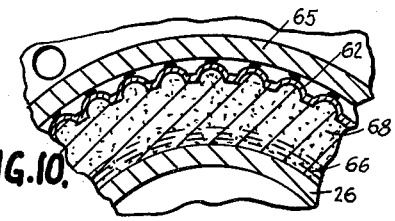

In FIGS. 9 and 10, the apparatus is arranged for producing an embossing roller in accordance with a modified method of the present invention. A matelasse fabric material 60 for heavy upholstery is sized with epoxy compound and secured with a thermo-setting adhesive, after the ends are abutted together, to the outer surface of the perforated shell 30 rather than to the inside surface thereof as hereinbefore explained. A tube 62 of unplasticized vinyl or deplasticized vinyl, as described in my patent application Serial No. 434,979, and having an inside diameter equal to the outside diameter of the cylinder plus the fabric supported thereon, is slipped over the tubular form of the fabric. The tube 62 is preferably of 12 mill thickness, though satisfactory results were obtained when the thickness was anywhere between 8 and 30 mill. The valve 43 is then shifted so that the port 41 is opened, whereupon a partial vacuum of approximately twenty-five inches of mercury may be provided within the space defined by the inner jacket 26 and the shell 30, so as to draw the walls of the tube 62 intimately against the surface of the fabric pattern. The assembly is then placed within the oven 48 and subjected to a temperature of between about 250° F. to about 350° F., following which it is removed and cooled while the vacuum is maintained. The shell is than removed from the assembly and the vinyl tube removed from the fabric pattern. This rigid vinyl molded tube is then inserted within an auxiliary cylinder 65 of slightly larger diameter so that the exterior surface of the vinyl tube may be adhered to the inside surface of the cylinder 65. Polyethylene release compound is then spread over the inside molded surface of the tube. The inner shell 26 which may be laminated with fibre glass 66 is placed within the cylinder 65 and the modified form of top plate 32a secured in proper assembly therewith. The same epoxy compound is then poured into the spout 37a between the molded surface and the surface of the epoxy covered fibre glass on the inner jacket. The casting operation with the respective curing steps hereinbefore described may then be carried out.

EXAMPLE V

Figure 12:
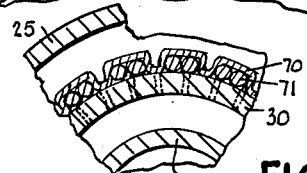
FIGS. 12 and 13 are similar to FIGS. 5 to 7, illustrating the steps of a still further modified method of the present invention.
Figure 13:
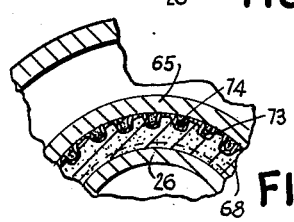
Figure 11:
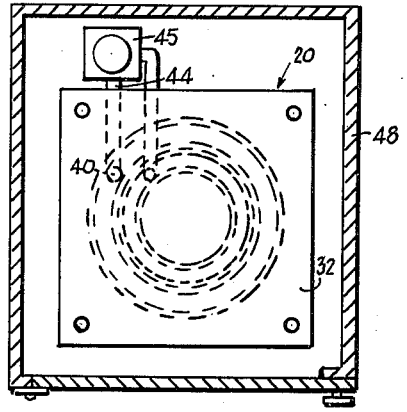
FIG. 11 is a transverse cross-sectional view showing the apparatus shown in FIGS. 1 to 4 within a curing oven.

In FIGS. 12 and 13, apparatus is shown for producing an embossing roller similar to that produced in connection with the arrangement discussed in connection with FIGS. 9 and 10, except that the fabric pattern 70 may be provided with a filler 71 to prevent collapse of hollow areas thereof under the action of the vinyl film during the molding thereof upon the exterior surface of the perforated shell 30. In a similar manner, a filler 74 may be used to bolster up the formed film 73 against the action and the weight of the resin during the casting operation. Epoxy resin, as well as plaster or phenolic filled sawdust and the like may be used for this purpose.

EXAMPLE VI

Figure 14:
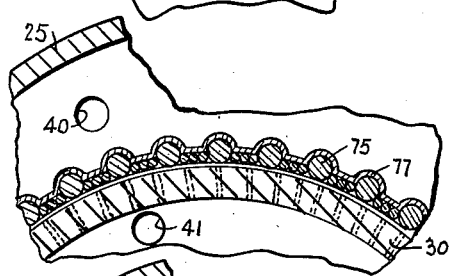
FIGS. 14 to 16 illustrate another modified method of the present invention.
Figure 15:
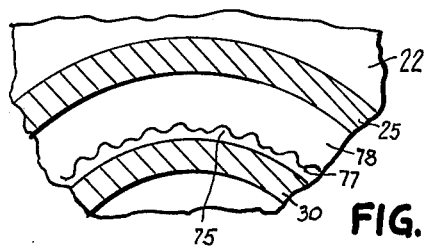
Figure 16:
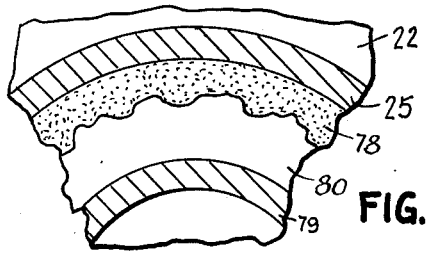

In FIGS. 14 to 16 of the drawing, a modified arrangement is shown wherein the formed fabric tube 75 is mounted upon the exterior surface of the perforated shell 30, as in Example IV. A resin tube 77 is secured to the exterior surface of the fabric in the manner hereinbefore described with respect to Example II. This may be of polyvinyl chloride of approximately one and one-half mill thickness. The space between the perforated shell and inside jacket may then be subjected to a vacuum of approximately twenty-five inches of mercury to draw the wall of the tube 77 intimately against the fabric. Maintaining this vacuum, the assembly is placed within the oven 48 and heated to approximately 350° F., following which it is removed therefrom and cooled while the vacuum is maintained. Heat-resisting plaster mixed with aluminum flakes is then poured in a cold state between the outer jacket 25 and the formed vinyl tube to provide a plaster cast 78. Vibration can be used to diminish the formation of air bubbles upon the inner surface of the plaster while it is poured and while setting. After the plaster has set and is cured, the plaster cast is removed from the assembly. The plaster mold 78 thus has a female relief design upon its inner surface which is thus used as the outer jacket for a new casting operation. An auxiliary shell 79 is inserted within the female surface of the plaster mold and molten aluminum is poured between the plaster outer shell and the auxiliary jacket 79. After the aluminum has cooled, the inner jacket 79 is removed and the plaster mold broken, thus leaving the aluminum cylinder 80 with the outer surface thereof conforming to the exact design and surface configuration of the fabric pattern 75. This roller may then be used on the cooling shaft of a pressure embosser or this roller may then be perforated by drilling for use on the aforementioned vacuum embossing apparatus.

EXAMPLE VII

Figure 18:
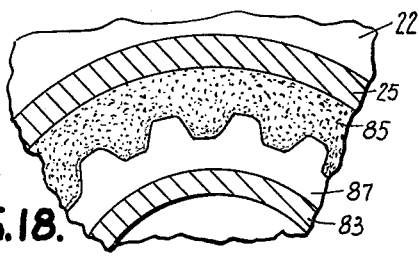
FIGS. 17 and 18 are illustrative of another method forming a part of the present invention.
Figure 17:
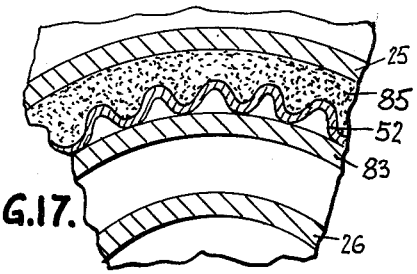

FIGS. 17 and 18 illustrate the manner in which an embossing cylinder can be constructed in accordance with a still further modified method of the present invention. In this arrangement, a porous female mold 87 made in accordance with the method described in connection with FIGS. 5 to 7 of the drawing, is used as the inner shell of the mold. An outer shell 25 is placed around the mold 87 in spaced relationship with the outer surface thereof and plaster 85 is then poured into that space to produce a plaster mold of the type hereinbefore described. This plaster mold will then have an inner surface with a male embossing and may be used for producing an aluminum roller 87 having a female embossing surface as defined by the pattern on the inside surface of the plaster mold 85 from which it is formed.

EXAMPLE VIII

Figure 19:
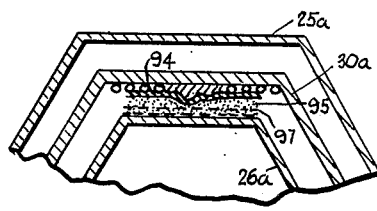
FIGS. 19 to 21 illustrate the steps for producing a polygonal embossing cylinder in accordance with the present invention.
Figure 21:
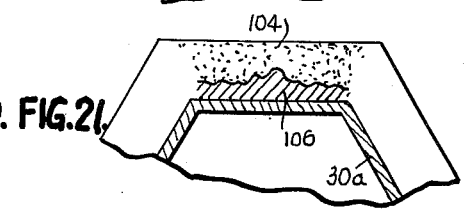
Figure 20:
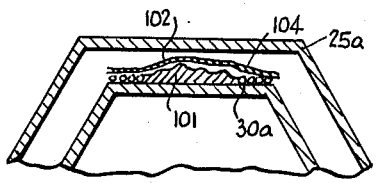

Referring now to FIGS. 19 to 21 of the drawing, polygonal prismatic forms similar to the cylindrical prismatic forms hereinbefore described, may be used to construct embossing members of polygonal shape for manufacturing various types of flat articles, such as plaques, frames, moldings, and the like. In this way, these articles can be reproduced in a continuous film, such as various parts of toys, containers, and the like. A polygonal embossing cylinder of this type may be manufactured from apparatus similar to that hereinbefore described, except for the particular shape of each of the elements. Thus, a polygonal perforated shell 30a is disposed intermediate the polygonal outer jacket 25a and the polygonal inner jacket 26a. Of course, correspondingly shaped base and top plates having aligned grooves are used to isolate and position the various elements. A flat plaque or figured article 93 of any type is placed in contact with the inner surface of the perforated wall 30a, as shown in FIG. 19. A tubular film 94 is then placed between the plaque and the inside jacket 26a and a vacuum created within the space between the outside jacket 25a and the perforated shell 30a so that the tube may be drawn into complete and intimate engagement with the exterior surface of the plaque 93. Following the aforementioned curing and setting steps, the epoxy resin 95 is poured into the space between the inner jacket 26a and the film 94 having the embossing surface. If desired, fibre glass 97 may be secured to the inner jacket 26a to add additional body to the finished cylinder.

EXAMPLE IX

In FIGS. 20 and 21, an alternate method of forming the polygonal prism is illustrated, in which case the plaque 101 is placed in engagement with the exterior surface of the perforated shell 30a. The tubular member 102 is then drawn over the top of the plaque and a vacuum produced between walls of the perforated shell 30a and the tubular member 102 to draw the tube into complete and intimate engagement with the surface of the plaque. After curing in the aforementioned manner, plaster cast 104 may be used to provide a cast for forming the metal mold 106 as described.

EXAMPLE X

Figure 22:
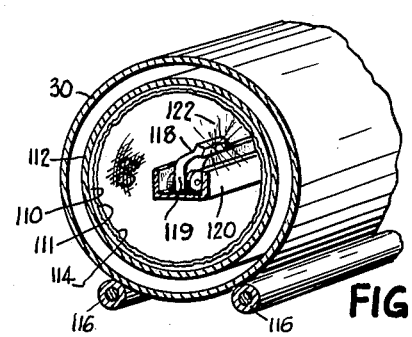
FIG. 22 is a fragmentary perspective view illustrating another method of forming an embossing roller in accordance with the present invention.
Figure 23:
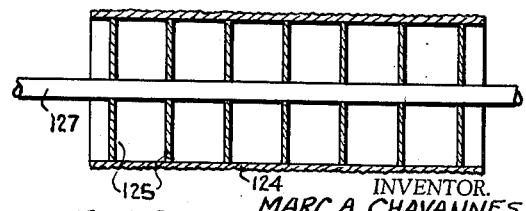
FIG. 23 is a longitudinal cross-sectional view of a roller constructed in accordance with the method outlined in connection with FIG. 22.

Reference is now made to FIGS. 22 and 23 of the drawing which illustrate a method of constructing metallic embossing roller by means of a metal spray device. A sheet of fabric 110 sized with epoxy base compound is secured with a thermosetting adhesive with its two ends butted together on the inner surface 111 of a true demountable and porous cylinder 112. A tube 114 of polyvinyl chloride resin of a thickness of 1½ mills, which outside diameter corresponds to the inside diameter of the cylinder with the fabric supported thereon, is inserted into the same pattern-lined cylinder. The cylinder is then placed within the jacket 25 in the manner hereinbefore described. A partial vacuum corresponding to approximately 25 inches of mercury is then produced on the film of the polyvinyl chloride tube and the cylinder, following which the unit is placed within a heated oven at a temperature sufficiently high enough to cause the polyvinyl chloride to mold itself perfectly against the adjacent surface of the fabric. A temperature of 350° F. has been found to be suitable for this purpose.

After the cylinder and vacuum jacket have cooled, the unit is placed upon a pair of supporting rollers 116, one of which is driven to rotate the cylinder about its longitudinal axis. A metalizing spray gun 118 mounted upon a longitudinal carriage 119 is moved into the interior of the cylinder at an angle of approximately 75 degrees to the vertical and molten metal 122 is sprayed against the embossed surface that is covered with the polyvinyl chloride film 114. The partial vacuum is maintained during this spraying operation. A first spray coat of approximately .040 inch of zinc followed by a second spray coat of .090 inch of aluminum has been found to be satisfactory for this purpose. In order to avoid irregularities, a draft of air blown at approximately 100 cubic feet per minute toward the oncoming spray carriage has been found to effect an even deposit of the spray material, while the speed of rotation of the cylinder at approximately 100 revolutions per minute allows the spraying of layers fine enough to permit the metal to cool so that it does not heat the polyvinyl chloride beyond its melting point upon contact therewith. After a sufficient amount of metal has been deposited in this minner, the formed metal shell 124 is removed from the mold and placed upon a spindle 127 having a plurality of longitudinally spaced apart discs 125 that have a diameter equal to the inside diameter of a shell 124. These discs sufficiently rigidify the shell 124 to permit it to be used directly as an embossing roller for thermoplastic material.

*Summary*

While various methods of producing embossing rollers have been disclosed, it will be recognized that certain basic features of this invention are common to all such methods. By the practice of these methods it is possible to coat all the interstices, crevices, and pores of the surface of a fibrous or porous material that is to be reproduced with a thin film of impervious material. This film prevents the entry of fluent casting material into the internally recessed undercuts, pores, and cavities that would otherwise damage the roller case therefrom during the casting operation. On the other hand, the extremely intimate contact of this thin film with all of the exposed surface irregularities and interstices makes it possible to very accurately reproduce the exact texture of the fabric. It is also within the purview of this invention to introduce the casting material to the mold, whether metallic or not, in still other ways different from the pouring and spraying described, such as by dipping, electro-depositing, etc., without sacrificing the exacting detail of reproduction.

In each of the aforementioned embodiments, the embossing cylinders can be polished, burnished, patched and repaired, as well as carved, sandblasted, or sandpapered. Thus, some parts of the cylinders can be polished or dulled artificially more than other parts after the mold is made so as to produce selective polished and matte surfaces on the embossed material.

Another advantage of the present invention is that these molds, when constructed of metal, can be cooled during the embossing operation by the use of artificial refrigeration means, brine, or the like from the inside thereof and, for the embossing of heavy sheets of material, cooling can thus be maintained on both sides thereof.

It will be recognized that it is important that the tubular portions be so constructed that the adjacent ends do not overlap each other which would produce a double thickness and thus leave a line on the finished roller which would detract from the appearance of the embossed material. Thus, the ends can be tapered, or the like to avoid this problem. In addition, zinc, copper, and lead alloys may be used in place of the aforementioned aluminum casting, as may be desired.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent is:

1. The method of making an embossing roller for embossing thermoplastic sheet material to reproduce the surface texture of a porous fabric, comprising the steps of: sizing the fabric which has the surface to be reproduced, curing the sized fabric, adhering said fabric upon the inner surface of a pervious hollow cylinder, with the opposite ends of said fabric butted together to form a continuous casting pattern, inserting into said cylinder in contact with said fabric a tube of polyethylene having a wall thickness of approximately one and one-half mill, subjecting the outside of said cylinder to a negative pressure to bring the polyethylene into direct and intimate surface contact with the fabric to achieve a cylinder assembly, heating said cylinder assembly to between about 180° F. and about 230° F. while being subjected to said negative pressure at which temperature said polyethylene is sufficiently softened to mold itself intimately against said fabric, cooling the cylinder assembly while said negative pressure is maintained, inserting concentrically into said cylinder assembly a demountable inner shell, the outside diameter of which is somewhat less than the inner diameter of the polyethylene-covered pattern fabric to provide a uniform cylindrical space between said inner shell and the covered pattern, pouring epoxy resin casting material into said space while said negative pressure is maintained, permitting said casting material to set to form a roller, curing said roller at progressive temperatures of about 150° F. for about one and one-half hours and of about 180° F. for about two hours, dismounting said cylinder assembly, completing said curing of said roller at 250° F. for two hours and at 350° F. for two hours, dismounting said inner shell to remove said roller, and perforating the wall of said roller with fine air holes.

2. The method of making an embossing roller for embossing thermoplastic sheet material to reproduce the surface of a pattern, comprising the steps of adhering said pattern to the inner surface of an air-pervious walled tube, covering said pattern with a polyethylene film having a thickness of approximately one and one-half mill, subjecting the outside of said tube to a negative pressure to bring the polyethylene film into direct and intimate surface contact with the pattern, heating the thus assembled tube, pattern and film to between about 180° F. to about 230° F. while being subjected to said negative pressure, at which temperature said polyethylene film is sufficiently softened to mold itself intimately against the surface of said pattern, cooling the assembled tube while said negative pressure is maintained, inserting concentrically into said assembled tube a demountable inner shell, the outside dimension of which is somewhat less than the inner dimension of the polyethylene-covered pattern to provide a substantially uniform space between said inner shell and the covered pattern to constitute a mold, pouring epoxy resin casting material into said space while said negative pressure is maintained, permitting said casting material to set to form a roller, curing said roller at progressive temperatures of about 150° F. for about one and one-half hours, and of about 180° F. for about 2 hours, then dismounting said tube assembly, completing the curing of said roller at about 250° F. for about two hours, and at about 350° F. for about two hours, then dismounting said inner shell to remove said roller, and perforating the wall of said roller with fine air holes.

3. The method of manufacturing an embossing roller for embossing thermoplastic sheet material to reproduce the surface texture of a porous fabric comprising the steps of: sizing the fabric which has the surface to be reproduced, curing the sized fabric, adhering said cured fabric upon the inner surface of an air-pervious hollow cylinder with the opposite ends of said fabric butted together to form a continuous pattern, inserting into said cylinder in contact with said fabric a tube of polyvinyl chloride having a wall thickness of about one and one-half mill, subjecting the outside of said cylinder to a negative pressure of about twenty-five inches of mercury to bring the polyvinyl chloride into direct surface contact with the surface of the fabric to achieve a cylinder assembly, heating said cylinder assembly to between about 250° F. and about 350° F. while being subjected to said negative pressure at which temperature said polyvinyl chloride is sufficiently softened to mold itself intimately against said fabric, cooling said cylinder assembly while said negative pressure is maintained, covering a demountable inner shell, the outer diameter of which is considerably less than the inner diameter of the outer cylinder, with layers of fibreglass fabric, adhering said fibreglass fabric in place with resin, applying parting material to said now rigid polyvinyl chloride tube, inserting said covered demountable inner shell concentrically into said cylinder assembly, pouring fluent casting resin into the space between the last layer of said fibreglass fabric and said polyvinyl chloride tube, permitting said resin to set to form a roller, curing said roller at progressive temperatures, dismounting said cylinder assembly, completing said curing of said roller at about 250° F. for about two hours and at about 350° F. for about two hours, dismounting said inner shell to remove said roller, and perforating of said roller with fine air holes.

4. The method of manufacturing an embossing roller for embossing thermoplastic sheet material to reproduce the surface texture of a porous fabric, comprising the steps of: sizing the fabric which has the surface to be reproduced, curing the sized fabric, adhering said cured fabric with the opposite ends thereof abutted together to form a continuous pattern upon the outer surface of an air-pervious hollow cylinder, disposing a tube of unplasticized polyvinyl chloride having a wall thickness of between about 8 and about 30 mill over said fabric-covered cylinder in contact with said fabric, subjecting the inside of said cylinder to a negative pressure of about twenty-five inches of mercury to bring the unplasticized polyvinyl chloride tube into direct surface contact with the surface of said fabric, heating said assembled cylinder while subjected to said negative pressure to between about 250° F. and about 350° F. at which temperature said polyvinyl chloride tube is sufficiently softened to mold itself intimately against said fabric, cooling the assembled cylinder while said negative pressure is maintained whereby said polyvinyl chloride tube is rigidified, dismounting said cylinder and removing said polyvinyl chloride tube therefrom with the impression from the fabric on the inside surface thereof, securing said rigid polyvinyl chloride tube within a larger demountable cylinder with the outside of said polyvinyl chloride tube in engagement with the inside of said cylinder, depositing a layer of zinc or tin upon the inner molded surface of the polyvinyl chloride tube and then depositing one or more layers of aluminum upon the tin or zinc layer to build up the desired thickness of wall of the finished embossing roller.

5. The method of manufacturing an embossing roller for embossing thermoplastic sheet material to reproduce the surface texture of a porous fabric comprising the steps of: sizing the fabric which has the surface to be reproduced, curing the sized fabric, adhering said cured fabric upon the inner surface of an air-pervious hollow cylinder with the opposite ends of said fabric butted together to form a continuous pattern, inserting into said cylinder in contact with said fabric a tube of polyvinyl chloride having a wall thickness of about one and one-half mill, subjecting the outside of said cylinder to a negative pressure of about twenty-five inches of mercury to bring the polyvinyl chloride into direct surface contact with the surface of the fabric to achieve a cylinder assembly, heating said cylinder assembly to between 250° F. and about 350° F. while being subjected to said negative pressure at which temperature said polyvinyl chloride is sufficiently softened to mold itself intimately against said fabric, cooling said cylinder assembly while said negative pressure is maintained, covering a demountable inner shell, the outer diameter of which is considerably less than the inner diameter of the outer cylinder, with layers of fibreglass fabric, adhering said fibreglass fabric in place with resin, applying parting material to said now rigid polyvinyl chloride tube, inserting said covered demountable inner shell concentrically into said cylinder assembly, spraying a layer of zinc or tin upon the inner molded surface of the polyvinyl chloride tube and then spraying one or more layers of aluminum upon the tin or zinc layer to build up the desired thickness of wall of the finished embossing roller.

6. The method of manufacturing an embossing roller for embossing thermoplastic sheet material to reproduce the surface texture of a porous fabric comprising the steps of: sizing the fabric which has the surface to be reproduced, curing the sized fabric, adhering said cured fabric with the opposite ends thereof abutted together to form a continuous pattern upon the outer surface of a porous hollow cylinder, disposing a tube of unplasticized vinyl having a wall thickness of between about 8 and about 30 mill over said cylinder and fabric in contact with said fabric, subjecting the inside of said cylinder to a negative pressure of about twenty-five inches of mercury to bring the unplasticized vinyl tube into direct surface contact with the surface of said fabric, heating said thus assembled cylinder while subjected to said negative pressure to between about 250° F. and about 350° F. at which temperature said vinyl tube is sufficiently softened to mold itself intimately against said fabric, cooling the assembled cylinder while said negative pressure is maintained whereby said vinyl tube is rigidified, dismounting said assembled cylinder and removing said vinyl tube therefrom with the impression from the fabric on the inside surface thereof, securing said rigid tube within a larger demountable cylinder with the outside of said tube in engagement with the inside of said cylinder, filling the spaces between said rigid tube and said larger demountable cylinder with resin to resist collapse of said tube during the casing operation, covering a demountable inner shell with layers of fibreglass fabric, adhering said fibreglass fabric in place with resin, inserting said covered demountable inner shell concentrically into said assembled cylinder, pouring epoxy resin in to the space between the last layer of said fibreglass fabric and said rigid tube, permitting said resin to set to form a roller, curing said roller at progressive temperatures of about 150° F. for about one and one-half hours and of about 180° F. for about two hours, dismounting said outer cylinder, completing said curing of said roller at about 250° F. for about two hours and at about 350° F. for about two hours, dismounting said molded inner shell and said epoxy resin as a single roller, and perforating the wall of said roller with fine air holes.

7. The method of manufacturing an embossing roller for embossing thermoplastic sheet material to reproduce the surface texture of a porous fabric comprising the steps of: sizing the fabric which has the surface to be reproduced, curing the sized fabric, adhering said cured fabric with the opposite ends thereof butted together to form a continuous pattern upon the outer surface of a porous hollow cylinder, disposing a tube of polyvinyl chloride having a wall thickness of about one and one-half mill over said cylinder in contact with said fabric, subjecting the inside of said cylinder to a negative pressure of twenty-five inches of mercury to bring the polyvinyl chloride into direct surface contact with the surface of the fabric, heating said thus assembled cylinder to between about 250° F. and about 350° F. while being subjected to said negative pressure, at which temperature said polyvinyl chloride is sufficiently softened to mold itself intimately against said fabric, cooling the assembled cylinder while said negative pressure is maintained, disposing a demountable inner shell over said assembled cylinder, pouring cold heat-resistant plaster and aluminum flakes into the space between said molded polyvinyl chloride and outer shell while said negative pressure is maintained, vibrating said assembly to diminish the formation of air bubbles upon the inner surface of the plaster, permitting said plaster to set, dismounting said inner and outer shells, inserting an inner demountable shell with said set plaster spaced therefrom, pouring molten aluminum into the space between said plaster outer shell having the mold surface on the inner side thereof and the outer surface of the inner shell, permitting said molten aluminum to set, dismounting said inner shell, destroying said plaster mold, and perforating said set aluminum cylinder having an outer male embossing surface thereon.

8. The method of manufacturing an embossing roller for embossing thermoplastic sheet material to reproduce the surface texture of a porous fabric comprising the steps of: sizing the fabric which has the surface to be reproduced, curing the sized fabric, adhering said cured fabric with the opposite ends thereof butted together to form a continuous pattern upon the inner surface of a porous hollow cylinder, inserting into said cylinder in contact with said fabric a tube of polyvinyl chloride having a wall thickness of about one and one-half mill, subjecting the inside of said cylinder to a negative pressure of twenty-five inches of mercury to bring the polyvinyl chloride into direct surface contact with the surface of the fabric to achieve a cylinder assembly, heating said cylinder assembly to between about 250° F. and about 350° F. while being subjected to said negative pressure, at which temperature said polyvinyl chloride film is sufficiently softened to mold itself intimately against said fabric, cooling the cylinder assembly while said negative pressure is maintained, inserting a demountable inner shell concentrically into said cylinder assembly, maintaining the temperature of said cylinder assembly at about 275° F., pouring a metallic alloy composed of about 80 parts of bismuth and about 20 parts of tin in molten condition into the space between said demountable inner shell and said assembled cylinder at about 335° F., and permitting said metal to cool.

9. The method of manufacturing a cylinder for working sheet material to reproduce the desired surface contour thereon comprising the steps of: forming into a cylindrical column, a portion of pattern material which has the surface to be reproduced, drawing a thin walled tube into engagement with said surface, rigidifying said tube wall in engagement with said surface, removing said pattern material, placing said rigidified tube concentrically within a cylinder, filling the space between said tube and said cylinder with a first fluent material, causing said first fluent material to harden, removing said tube, placing a smaller cylinder concentrically within said hardened first fluent material, filling the space between said hardened first fluent material and said smaller cylinder with a dissimilar second fluent material, permitting said dissimilar second fluent material to set, and removing said hardened first material therefrom.

10. The method of making an embossing roller for embossing thermoplastic sheet material to reproduce the surface of a pattern, comprising the steps of adhering said pattern to the inner surface of an air-pervious walled tube, covering said pattern with a polyethylene film having a thickness of approximately one and one-half mill, subjecting the outside of said tube to a negative pressure to bring the polyethylene film into direct and intimate surface contact with the pattern, heating the thus assembled tube, pattern and film to between about 180° F. to about 230° F. while being subjected to said negative pressure, at which temperature said polyethylene film is sufficiently softened to mold itself intimately against the surface of said pattern, cooling the assembled tube while said negative pressure is maintained, spraying fluent casting material evenly upon said conformed thermoplastic tube to a predetermined thickness, allowing said casting material to set, removing the casting thus formed and perforating said sprayed casting and mounting same upon a mandrel for use as an embossing roller.

11. The method of manufacturing an embossing roller for embossing thermoplastic sheet material to reproduce the surface texture of a porous fabric comprising the steps of: sizing the fabric which has the surface to be reproduced, curing the sized fabric, adhering said cured fabric upon the inner surface of an air-pervious hollow cylinder with the opposite ends of said fabric butted together to form a continuous pattern, inserting into said cylinder in contact with said fabric a tube of polyvinyl chloride having a wall thickness of about one and one-half mill, subjecting the outside of said cylinder to a negative pressure of about twenty-five inches of mercury to bring the polyvinyl chloride into direct surface contact with the surface of the fabric to achieve a cylinder assembly, heating said cylinder assembly to between 250° F. and about 350° F. while being subjected to said negative pressure at which temperature said polyvinyl chloride is sufficiently softened to mold itself intimately against said fabric, spraying a layer of zinc or tin upon the inner molded surface of the polyvinyl chloride tube and then spraying one or more layers of aluminum upon the tin or zinc layer to build up the desired thickness of wall of the finished embossing roller.

12. The method of manufacturing an embossing roller for embossing thermoplastic sheet material to reproduce the surface texture of a porous fabric, comprising the steps of: sizing the fabric which has the surface to be reproduced, curing the sized fabric, adhering said cured fabric with the opposite ends thereof abutted together to form a continuous pattern upon the outer surface of an air-pervious hollow cylinder, disposing a tube of polyethylene film having a thickness of approximately one and one-half mill over said fabric-covered cylinder in contact with said fabric, subjecting the inside of said cylinder to a negative pressure of about twenty-five inches of mercury to bring the polyethylene film into direct and intimate surface contact with the surface of said pattern fabric, heating said assembled cylinder while subjected to said negative pressure to between about 180° F. and about 230° F. at which temperature said polyethylene tube is sufficiently softened to mold itself intimately against said pattern fabric, to form a mold surface, making a plaster cast of said mold surface, removing said plaster cast from said mold surface, and pouring casting material into said plaster cast and when the casting material has set, removing the casting from the plaster cast.

(References on following page)

References Cited in the file of this patent

UNITED STATES PATENTS

| | | |
|---|---|---|
| 2,046,503 | Cooper | July 7, 1936 |
| 2,046,504 | Cooper | July 7, 1936 |
| 2,246,976 | Goulding | June 24, 1941 |
| 2,309,186 | Goulding | Jan. 26, 1943 |
| 2,366,935 | Schmid | Jan. 9, 1945 |
| 2,629,907 | Hugger | Mar. 3, 1953 |
| 2,767,105 | Fletcher | Oct. 1, 1956 |
| 2,776,253 | Scholl | Jan. 1, 1957 |
| 2,793,571 | Way | May 28, 1957 |
| 2,814,074 | Butzko | Nov. 26, 1957 |
| 2,836,852 | Butzko | June 3, 1958 |
| 2,855,653 | Kastenbein | Oct. 14, 1958 |